United States Patent [19]

Takeuchi et al.

[11] 4,397,994

[45] Aug. 9, 1983

[54] HIGH VINYL POLYBUTADIENE OR STYRENE-BUTADIENE COPOLYMER

[75] Inventors: Yasumasa Takeuchi; Yoshito Yoshimura, both of Yokkaichi; Noboru Ohshima, Suzuka; Mitsuhiko Sakakibara; Akira Tsuji, both of Yokkaichi, all of Japan

[73] Assignee: Japan Synthetic Rubber Co., Ltd., Tokyo, Japan

[21] Appl. No.: 303,518

[22] Filed: Sep. 18, 1981

[30] Foreign Application Priority Data

Sep. 20, 1980 [JP] Japan ................. 55-130979
Dec. 16, 1980 [JP] Japan ................. 55-176515
Dec. 16, 1980 [JP] Japan ................. 55-177831

[51] Int. Cl.$^3$ .......................... C08F 8/18; C08F 8/44
[52] U.S. Cl. ........................ 525/332.3; 526/180; 526/181; 526/335; 526/340
[58] Field of Search .................. 525/333, 334; 526/332.3

[56] References Cited

U.S. PATENT DOCUMENTS

| | | | |
|---|---|---|---|
| 3,301,840 | 1/1967 | Zelinski | 260/94.2 |
| 3,393,182 | 7/1968 | Trepka | 260/79.5 |
| 3,692,874 | 9/1972 | Farrar et al. | 525/333 |
| 3,741,927 | 6/1973 | Nordsick et al. | 260/33.6 AQ |
| 4,026,865 | 5/1977 | Uranek et al. | 525/333 |
| 4,230,815 | 10/1980 | Itoh et al. | 526/335 |

OTHER PUBLICATIONS

Abstract, British 871073, (1979).

*Primary Examiner*—Stanford M. Levin
*Attorney, Agent, or Firm*—Oblon, Fisher, Spivak, McClelland & Maier

[57] ABSTRACT

High vinyl polybutadiene or styrene-butadiene copolymer obtained by polymerizing 1,3-butadiene alone or with styrene in a hydrocarbon solvent using an organolithium compound as an initiator and coupling the resulting polymer, characterized in that (1) the polybutadiene or styrene-butadiene copolymer comprises at least 20% by weight of a polymer having in its molecular chain a linkage between butadienyl and at least one metal selected from the group consisting of silicon, germanium, tin and lead, (2) the styrene content of said copolymer is 40% by weight or less, and (3) the polybutadiene or the butadiene portion of the styrene-butadiene copolymer has a vinyl content of 50 to 95%.

Said polybutadiene or styrene-butadiene copolymer has low rolling resistance, high wet skid resistance, highly improved fracture property and, an excellent processability.

9 Claims, No Drawings

HIGH VINYL POLYBUTADIENE OR STYRENE-BUTADIENE COPOLYMER

The present invention relates to an improved polybutadiene or styrene-butadiene copolymer containing a butadienyl-metal linkage. More particularly, the present invention relates to a polybutadiene or a styrene-butadiene copolymer containing a butadienyl-metal linkage and having an average vinyl content in the butadiene portion of 50% or more, which polybutadiene or styrene-butadiene copolymer is low in rolling resistance, high in resistance on a wet surface (referred to hereinafter as wet skid resistance), and excellent in fracture property.

Recently, rubber materials of low rolling resistance, and high wet skid resistance has become strongly desired as the tire tread rubber for passenger car from the requirement of low fuel consumption and running safety of automobiles. However, these properties are contradictory to one another and hence a blend of dissimilar rubbers has been employed in order to match these properties.

For example, as a tire tread rubber for passenger car, there has been widely used a blend of a styrene-butadiene copolymer such as emulsion polymerized styrene-butadiene copolymer, solution polymerized styrene-butadiene copolymer or the like, with a polybutadiene such as high-cis polybutadiene, low-cis polybutadiene or the like.

Such a blend is, however, not necessarily satisfactory in wet skid resistance and rolling resistance.

Recently, compositions comprising a polybutadiene having a high vinyl content have been proposed as satisfying the above-mentioned objects. However, it has been found that said compositions are improved more or less in wet skid resistance and rolling resistance, but deteriorated remarkably in fracture property and abrasion resistance and hence have a problem in practice.

An object of the present invention is to provide a high vinyl polybutadiene or styrene-butadiene copolymer having a low rolling resistance, high wet skid resistance, a markedly improved fracture property and an excellent processability.

Other objects and advantages of this invention will become apparent from the following description.

According to the present invention, there is provided a high vinyl polybutadiene or styrene-butadiene copolymer obtained by polymerizing 1,3-butadiene alone or with styrene in a hydrocarbon solvent using an organolithium compound as an initiator, and coupling the resulting polymer with a coupling agent, characterized in that (i) said polybutadiene or styrene-butadiene copolymer contains at least 20% by weight of a polymer having in its molecular chain a linkage between butadienyl and at least one metal selected from the group consisting of silicon, germanium, tin and lead, (ii) said copolymer has a styrene content of 40% by weight or less, preferably 5 to 40% by weight, (iii) said polybutadiene or the butadiene portion of said copolymer has a vinyl content of 50 to 95%.

The polybutadiene or styrene-butadiene copolymer of the present invention contains a polymer having in its molecular chain a linkage between butadienyl and at least one metal selected from the group consisting of silicon, germanium, tin and lead in an amount of at least 20% by weight, preferably at least 40% by weight.

The content of the polymer having a metal-butadienyl linkage can easily be determined from the component on the high molecular weight side measured by a gel permeation chromatography (GPC). When the content of the polymer having a metal-butadienyl linkage is less than 20% by weight, the rolling resistance and fracture property are insufficient. In particular, a styrene-butadiene copolymer containing a polymer having in its molecular chain a tin-butadienyl linkage is preferable from the viewpoint of rolling resistance and processability.

One of the characteristic features of the polybutadiene or styrene-butadiene copolymer of the present invention is that it has a metal-butadienyl linkage in the molecular chain, and a styrene-butadiene copolymer having a metal-styryl linkage in the molecular chain is not sufficiently improved in rolling resistance.

Furthermore, the polybutadiene or the butadiene portion of the styrene-butadiene copolymer in the present invention has a vinyl content of 50 to 95% by weight, preferably 60 to 95% by weight, and the above copolymer has a styrene content of at most 40% by weight, preferably 5 to 40% by weight. When the vinyl content is less than 50% by weight, the wet skid resistance is insufficient. On the other hand, a styrene-butadiene copolymer having a vinyl content of more than 95% by weight is difficult to produce. Further, when the styrene content is 5% or more, the improvement in fracture property becomes more significant, but if it exceeds 40%, there is no further improvement in fracture property, and the rolling resistance is rather deteriorated, and hence, it is not desirable.

The addition sequence of styrene is not critical, but substantially random addition sequence is particularly preferred from the viewpoint of rolling resistance.

The blocked styrene content in the bound styrene is preferably 10% or less (the degree of blocking can be measured according to the method of I. M. Kolthoff et al. described in J. Polymer Sci., Vol. 1, p. 429 (1946)).

The Mooney viscosity of the polybutadiene or styrene-butadiene copolymer of the present invention is not critical, though it is preferably 20 to 150 in terms of $ML_{1+4}^{100°C.}$.

The polybutadiene or styrene-butadiene copolymer of the present invention having a butadienyl-metal linkage in its molecular chain is prepared by polymerizing 1,3-butadiene alone or with styrene in a hydrocarbon solvent in the presence of an ether or a teriary amine as a micro-structure controlling agent using an organolithium compound as an initiator, and then adding a small amount of 1,3-butadiene to the polymer mixture to convert the polymer chain end or ends to butadienyl-lithium, adding a halide of at least one metal selected from the group consisting of silicon, germanium, tin and lead to the terminal-converted polymer and subjecting the resulting mixture to coupling reaction.

Furthermore, a polybutadiene or a styrene-butadiene copolymer having an appropriate breadth of the distribution of vinyl content in the butadiene portion of the polymer chain can be prepared by initiating the homopolymerization of 1,3-butadiene or copolymerization of styrene with 1,3-butadiene in a hydrocarbon solvent in the presence of an ether or a tertiary amine at a polymerization initiation temperature (Ti) of $-20°$ to $+50°$ C. and copolymerizing under the temperature-raising polymerization conditions that the difference between the maximum polymerization temperature (Tmax) and the polymerization initiation temperature (ΔT=Tmax−Ti) is at least 40° C. but at most 100° C., adding thereafter a small amount of 1,3-butadiene and subjecting the mixture to coupling reaction with a metal halide.

The breadth of distribution of the vinyl content means the difference between the vinyl content at the polymerization initiation temperature (Ti) and the vinyl content at the maximum polymerization temperature (Tmax) expressed by %. The breadth of distribution of vinyl content is preferably 20% or more from the viewpoint of abrasion resistance, wet skid resistance and fracture property.

Examples of the organolithium initiator used in the present invention are methyllithium, ethyllithium, n-butyllithium, sec-butyllithium, tert-butyllithium, amyllithium, phenyllithium, tolyllithium, vinyllithium, propenyllithium, tetramethylenedilithium, pentamethylenedilithium, hexamethylenedilithium, 1,3-bis(1-lithio-3-methylphenyl)benzene, 1,1,4,4-tetraphenyl-1,4-dilithiobutane and the like.

The amount of the organolithium initiator used is determined based upon the molecular weight of the polymer formed, and it is usually about 0.05 to 10 mg atom, preferably 0.1 to 5 mg atom, in terms of lithium atom, per 100 g of the monomer.

As a micro-structure controlling agent, there may be mentioned, for example, ethers such as dioxane, tetrahydrofuran, and derivatives thereof, ethylene glycol dimethyl ether, ethylene glycol diethyl ether, ethylene glycol dibutyl ether, diethylene glycol dimethyl ether, triethylene glycol dimethyl ether, and derivatives thereof or the like; teriary amines such as triethylamine, N,N,N',N'-tetramethylethylenediamine and the like. The amount of the micro-structure controlling agent used varies depending upon the micro-structure of the objective polybutadiene or styrene-butadiene copolymer, and it is in the range of from 0.05 to 2,000 moles, preferably 0.2 to 1,000 moles, per mole of organolithium compound.

Examples of hydrocarbon solvents are aromatic hydrocarbons such as benzene, toluene, xylene, ethylbenzene and the like; cycloaliphatic hydrocarbons such as cyclohexane, methylcyclopentane, cyclooctane and the like; aliphatic hydrocarbons such as propane, butane, pentane, n-hexane, n-heptane, octane, decane and the like. These hydrocarbons may be used in combination of two or more. Among the above solvents, benzene, cyclohexane, n-hexane, n-heptane and the like are preferred. The solvent may be used in an amount of 1 to 20 parts by weight per part by weight of the monomer.

In the present invention, the formation of a butadienyl-lithium terminal at the active end of the polybutadiene or styrene-butadiene copolymer can be judged from the hue of the polymer system. That is to say, at the styryl-lithium terminal, the polymer system shows a reddish brown color characteristic of styryl anion, but when a small amount of butadiene is added, the styryl-lithium terminal is converted to butadienyl-lithium terminal showing a yellow color. Although this can be confirmed by a ultraviolet spectrophotometer, the formation of butadienyl-lithium terminal can easily and conveniently be judged from a change in hue.

The amount of a coupling agent added is 0.2 to 3.0 equivalents in terms of halogen atom of the metal halide per equivalent of butadienyl-lithium.

As the metal halide used for the preparation of the polybutadiene or styrene-butadiene copolymer of the present invention, there may be mentioned the compounds represented by the formulas (1), (2) and (3):

$$R_nMX_{4-n} \quad (1)$$

$$M'X_2 \quad (2)$$

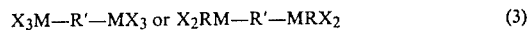

$$X_3M-R'-MX_3 \text{ or } X_2RM-R'-MRX_2 \quad (3)$$

wherein M is Si, Ge, Sn or Pb; M' is Sn or Pb; X is chlorine, bromine or iodine; R is alkyl, allyl, or aryl; R' is alkylene or arylene; n is an integer of from 0 to 2.

As the metal halide, there may preferably be used silicon tetrachloride, silicontetrabromide, silicon tetraiodide, germanium tetrachloride, germanium tetrabromide, tin tetrachloride, tin dichloride, lead chloride, tin tetrabromide, methyl trichlorosilane, dimethyl dichlorosilane, butyl trichlorotin, dibutyl dichlorotin, bis(trichlorosilyl)ethane, bis(trichlorostannyl)ethane and the like.

The polybutadiene or styrene-butadiene copolymer of the present invention can be used for various industrial uses including tire, particularly tire tread, alone or in blend with natural rubber or synthetic rubber, which blend is, if necessary, oil-extended, compounded with conventional compounding agents for vulcanized rubber, and vulcanized.

The present invention will be explained in more detail below referring to Examples. However, the present invention is not limited to the Examples.

Physical properties were measured according to the following methods:

In each Example, the micro-structure of the polybutadiene rubber was measured according to the method of D. Morero et al. [Chim. e Ind. 41, 758 (1959)]. For indicating the wet skid property, there was used an index of wet skid resistance measured by a portable skid tester (manufactured by Stanley Corp., England). For indicating the rolling resistance, there was used an index of Dunlop resilience. For indicating the fracture property, there was used a tensile strength. The tensile strength was measured according to JIS K-6301.

Examples 1 and 2, and Comparative Example 1

Into a sufficiently dried 6-liter autoclave equipped with an anchor type agitating blade were charged 2,500 g of cyclohexane, 500 g of 1,3-butadiene, and 25 g of tetrahydrofuran under a nitrogen atmosphere, and 0.3 g of n-butyllithium was added to the mixture at different temperatures as shown in Table 2. The resulting mixture was subjected to polymerization. Then, 0.110 g of stannic chloride was added thereto as a coupling agent, and the reaction was carried out for a further one hour.

To the polymer solution was added 5 ml of a methanol solution having dissolved therein 5 g of 2,6-di-tert.-butyl-p-cresol, and the solvent was removed by steam stripping, after which the polymer was dried on a hot roll. The reaction was quantitative in each case. The polybutadiene obtained was compounded according to the recipe shown in Table 1 by means of an internal mixer and rolls, and vulcanized at 145° C. for 30 minutes. The vulcanizate thus obtained was then subjected to measurement of physical properties. The results are shown in Table 2.

The products obtained in Examples 1 and 2 showed a well-balanced value in rolling resistance, wet skid resistance and fracture property.

On the other hand, it is apparent that in Comparative Example 1 in which a vinyl content is out of the range specified in the present invention, the wet skid resistance and fracture property are inferior.

TABLE 1

|  | Parts by weight |
|---|---|
| Polybutadiene | 100 |
| HAF Carbon | 50 |
| Stearic acid | 2 |
| Zinc oxide | 3 |
| Anti-aging agent 810 NA[1] | 1 |
| Vulcanization accelerator CZ[2] | 0.6 |
| Vulcanization accelerator M[3] | 0.6 |
| Vulcanization accelerator D[4] | 0.4 |
| Sulfur | 1.5 |

Note:
[1] N—phenyl-N'—isopropyl-p-phenylenediamine
[2] N—cyclohexyl-2-benzothiazolylsulfenamide
[3] 2-Mercaptobenzothiazole
[4] 1,3-Diphenylguanidine

TABLE 2

|  | Example | | Comparative Example |
|---|---|---|---|
|  | 1 | 2 | 1 |
| Polymerization temperature (°C.) | 20 | 40 | 100 |
| Properties of polymer | | | |
| Microstructure (%) | | | |
| Cis-1,4 content | 6 | 11 | 20 |
| Trans-1,4 content | 9 | 19 | 40 |
| Vinyl content | 85 | 70 | 40 |
| Mooney viscosity ($ML_{1+4}^{100°\,C.}$) | 65 | 63 | 54 |
| Tin-butadienyl bond-containing polymer content (% by wt.) | 50 | 50 | 36 |
| Properties of vulcanizate | | | |
| Tensile strength (kgf/cm$^2$) | 205 | 208 | 185 |
| Wet skid index[1] (25° C.) | 135 | 130 | 100 |
| Dunlop resilience index[2] | | | |
| (25° C.) | 97 | 102 | 100 |
| (70° C.) | 98 | 99 | 100 |

Note:
[1] The wet skid index is a comparison of the values obtained by means of a wet skid tester in which the value in Comparative Example 1 is indicated as 100. The larger the index, the higher the resistance, that is, the better the property.
[2] Indicated using the data in Comparative Example 1 as 100. The larger the index, the lower the rolling resistance, that is, the better the property.

Examples 3 to 5

Into a sufficiently dried 6-liter autoclave equipped with a anchor type agitating blade were charged 2,500 g of cyclohexane, 500 g of 1,3-butadiene and 25 g of tetrahydrofuran under a nitrogen atmosphere and the temperature of the resulting mixture was adjusted to 0° C. Then, 0.4 g of n-butyllithium was added thereto and polymerization was carried out for one hour without removing the heat. Subsequently, various coupling agents shown in Table 3 were added in an amount of ¼ equivarent per one atom of n-butyllithium. The reaction was effected for 30 minutes, and a solution of 5 g of 2,6-di-tert-butyl-p-cresol in 5 ml of methanol was thereafter added to the reaction mixture, after which the solvent was removed by steam stripping. The residue was dried on a hot roll. The reaction proceeded quantitatively. The polybutadiene obtained was compounded according to the same recipe as in Example 1, vulcanized and subsequently subjected to measurement of physical properties of vulcanizate in the same manner as in Example 1. The results are shown in Table 3.

Comparative Example 2

A polybutadiene was obtained in the same manner as in Example 3, except that the coupling agent was not added, and subjected to compounding, vulcanization and measurement of physical properties in the same manner as in Example 3. The results are shown in Table 3.

TABLE 3

|  | Example | | | Comparative Example |
|---|---|---|---|---|
|  | 3 | 4 | 5 | 2 |
| Kind of coupling agent | SiCl$_4$ | GeCl$_4$ | SnCl$_4$ | none |
| Amount of coupling agent added (g) | 0.133 | 0.167 | 0.203 | 0 |
| Properties of polymer | | | | |
| Microstructure (%) | | | | |
| Cis-1,4 content | 7 | 8 | 7 | 7 |
| Trans-1,4 content | 11 | 10 | 11 | 11 |
| Vinyl content | 82 | 82 | 82 | 82 |
| Mooney viscosity ($ML_{1+4}^{100°\,C.}$) | 48 | 46 | 48 | 45 |
| Metal-butadienyl bond-containing polymer content (% by wt.) | 53 | 51 | 52 | 0 |
| Properties of vulcanizate | | | | |
| Tensile strength (kgf/cm$^2$) | 202 | 200 | 206 | 160 |
| Wet skid index[1] (25° C.) | 102 | 101 | 102 | 100 |
| Dunlop resilience index[2] (25° C.) | 125 | 122 | 125 | 100 |
| Dunlop resilience index[2] (70° C.) | 109 | 111 | 113 | 100 |

Note:
[1] Measured by means of a skid tester, and the values obtained are indicated as index using the value in Comparative Example 2 as 100. The larger the index, the better the property.
[2] The values are indicated as index using the value in Comparative Example 2 as 100. The larger the index, the better the property.

Examples 6 to 8 and Comparative Example 3

Into a sufficiently dried 6-liter autoclave equipped with an anchor type agitating blade were charged 2,500 g of cyclohexane, 500 g of 1,3-butadiene and 25 g of tetrahydrofuran under a nitrogen atmosphere, and the temperature of the resulting mixture was adjusted to 0° C. Subsequently, 0.45 g of n-butyllithium was added thereto and polymerization was carried out for one hour without removing the heat. Then, a predetermined amount of stannic chloride was added to the polymerization mixture as a coupling agent, and reaction was carried out for 30 minutes. To the polymer solution thus obtained was added a solution of 5 g of 2,6-di-tert.-butyl-p-cresol in 5 ml of methanol. The solvent was removed by steam stripping, and the residue was dried on a hot roll. The polybutadiene thus obtained was compounded according to the same recipe as in Example 1, vulcanized and subjected to measurement of physical properties in the same manner. The results are shown in Table 4.

It is seen from Table 4 that the tensile strength (fracture property) increases with an increase of the tin-butadienyl bond-containing polymer content. It is also seen that in Examples 6 to 8, the products are well balanced in rolling resistance, wet skid resistance and fracture property.

TABLE 4

|  | Comparative Example 3 | Example 6 | Example 7 | Example 8 |
|---|---|---|---|---|
| Properties of polymer | | | | |
| Microstructure (%) | | | | |
| Cis-1,4 content | 7 | 8 | 7 | 7 |
| Trans-1,4 content | 11 | 10 | 11 | 11 |
| Vinyl content | 82 | 82 | 82 | 82 |
| Mooney viscosity ($ML_{1+4}^{100°C}$) | 30 | 55 | 75 | 100 |
| Tin-butadienyl bond-containing polymer content (% by wt.) | 0 | 31 | 60 | 79 |
| Properties of vulcanizate | | | | |
| Tensile strength (kgf/cm$^2$) | 154 | 180 | 200 | 215 |
| Wet skid index[1] (25° C.) | 100 | 101 | 102 | 102 |
| Dunlop resilience index[2] (70° C.) | 100 | 109 | 118 | 122 |

Note:
[1] Measured by means of a skid tester and the values are indicated as index using the value in Comparative Example 3 as 100. The larger the index, the better the property.
[2] The values are indicated as index using the value in Comparative Example 3 as 100. The larger the index, the better the property.

Examples 9 to 11 and Comparative Examples 4 to 6

Into a 50-liter reactor were charged cyclohexane, 1,3-butadiene, tetrahydrofuran (THF) and styrene, in the amount shown in Table 5, under a nitrogen atmosphere and the temperature of the resulting mixture was adjusted to 30° C. Subsequently, n-butyllithium was added thereto, and polymerization was carried out under a raising temperature for one hour. Then, 1,3-butadiene was added thereto and polymerization was further conducted, after which the styryl anions at the polymer chain ends (red to yellowish red) were changed to butadienyl anions (yellow). Then, a coupling agent was added thereto and reaction was effected at 70° C. for a further 30 minutes.

To the polymer solution was added 30 g of 2,6-di-tert-butyl-p-cresol, and the solvent was removed from the polymer solution by steam stripping, after which the residue was dried on a hot roll at 110° to obtain a polymer.

The polymerization conditions, the kind of coupling agents and the conditions for reaction with the coupling agents are shown in Table 5. The polymer was compounded according to the recipe shown in Table 6 by means of an internal mixer and rolls, and vulcanized at 145° C. for 20 minutes.

Properties of the raw polymer and the vulcanizate are shown in Table 7.

Comparative Example 4 shows the case wherein a coupling agent was added without adding the above-mentioned additional 1,3-butadiene. Comparative Example 5 shows the case wherein the additional 1,3-butadiene was added, but the coupling agent was not added. Comparative Example 6 shows the case wherein the vinyl content of the butadiene portion of the copolymer was less than 50%.

It is seen from the results shown in Table 5 that the products in Examples 9, 10 and 11 are excellent in wet skid resistance, rolling resistance and tensile strength.

The polymer having a tin-styryl bond in Comparative Example 4 is inferior in rolling resistance.

The uncoupled polymer in Comparative Example 5 is inferior in tensile strength and rolling resistance.

The polymer having a vinyl content of less than 50% in Comparative Example 6 is inferior in wet skid resistance.

TABLE 5

|  | Example 9 | Example 10 | Example 11 | Comparative Example 4 | Comparative Example 5 | Comparative Example 6 |
|---|---|---|---|---|---|---|
| Cyclohexane (Kg) | 21 | 21 | 21 | 21 | 21 | 21 |
| 1,3-Butadiene (g) | 2370 | 2370 | 2370 | 2400 | 2370 | 2370 |
| Styrene (g) | 600 | 600 | 600 | 600 | 600 | 600 |
| Tetrahydrofuran (g) | 120 | 120 | 120 | 120 | 120 | 30 |
| n-Butyllithium (g) | 1.95 | 2.10 | 1.95 | 1.95 | 1.20 | 1.95 |
| Polymerization temperature (°C.)* | 30→87 | 30→87 | 30→86 | 30→87 | 30→87 | 30→85 |
| Polymerization conversion (%) | 100 | 100 | 100 | 100 | 100 | 100 |
| Additionally added, 1,3-butadiene (g) | 30 | 30 | 30 | 0 | 30 | 30 |
| Kind of coupling agent | SnCl$_4$ | SnCl$_4$ | SiCl$_4$ | SnCl$_4$ | — | SnCl$_4$ |
| Amount of coupling agent (g) | 0.69 | 1.50 | 0.45 | 0.60 | 0 | 0.69 |

Note:
*Indicates polymerization initiation temperature → maximum polymerization temperature

TABLE 6

|  | Parts by weight |
|---|---|
| Polymer | 100 |
| HAF Carbon | 50 |
| Stearic acid | 2 |
| Zinc oxide | 3 |
| Anti-ageing agent 810 NA[1] | 1 |
| Vulcanization accelerator TP[2] | 0.8 |
| Vulcanization accelerator DPG[3] | 0.6 |
| Vulcanization accelerator DM[4] | 1.2 |
| Sulfur | 1.5 |

Note:
[1] N—phenyl-N'—isopropyl-p-phenylenediamine
[2] Sodium dibutyldithiocarbamate
[3] Diphenylguanidine
[4] Dibenzothiazyldisulfide

TABLE 7

|  | Example 9 | Example 10 | Example 11 | Comparative Example 4 | Comparative Example 5 | Comparative Example 6 |
|---|---|---|---|---|---|---|
| Mooney viscosity ($ML_{1+4}^{100°C}$) | 61 | 62 | 62 | 61 | 63 | 62 |
| Bound styrene (% by wt.) | 20 | 20 | 20 | 20 | 20 | 20 |
| Microstructure (%) Cis/vinyl/trans | 17/55/28 | 17/55/28 | 16/56/28 | 17/55/28 | 17/55/28 | 20/45/35 |
| Proportion of butadienyl-metal bond-containing polymer (% by wt.) | 40 | 75 | 40 | 40* | 0 | 40 |
| Properties of vulcanizate | | | | | | |
| 300% modulus (kgf/cm$^2$) | 164 | 191 | 191 | 168 | 160 | 170 |

TABLE 7-continued

|  | Example | | | Comparative Example | | |
|---|---|---|---|---|---|---|
|  | 9 | 10 | 11 | 4 | 5 | 6 |
| Tensile strength (kgf/cm$^2$) | 247 | 256 | 251 | 240 | 220 | 250 |
| Elongation (%) | 390 | 398 | 380 | 390 | 380 | 400 |
| Hardness (JIS-A) | 68 | 70 | 69 | 69 | 68 | 70 |
| Resilience (%) 25° C. | 62 | 66 | 62 | 59 | 54 | 65 |
| Resilience (%) 70° C. | 77 | 79 | 75 | 72 | 69 | 77 |
| Wet skid, 25° C. | 72 | 72 | 69 | 69 | 68 | 63 |

Note:
*Indicates the proportion of styryl-tin bond.

Examples 12 to 13 and Comparative Example 7

Into a 5-liter reactor were charged cyclohexane, 1,3-butadiene, dimethoxyethane, and styrene in the amounts shown in Table 8, under a nitrogen atmosphere and the temperature of the resulting mixture was adjusted to 10° C. n-Butyllithium was added, and polymerization was carried out for one hour while raising the temperature. A small amount of 1,3-butadiene was further added, and polymerization was continued, upon which the styryl anions (red) at the polymer chain ends changed to butadienyl anions (yellow). Thereafter, a coupling agent was added thereto and reaction was carried out at 60° C. for 30 minutes.

To the polymer solution was added 30 g of 2,6-di-tert-butyl-p-cresol, and the solvent was removed from the polymer solution by steam stripping. The residue was dried on a hot roll at 110° C. to obtain a polymer.

In Comparative Example 7, a polymer having a Mooney viscosity of 55 was obtained without adding the coupling agent. The results were summarized in Tables 8 and 9. The polymer was compounded according to the recipe shown in Table 6, and the mixture was subjected to press-vulcanization at 145° C. for 35 minutes. The physical properties of the vulcanizate were measured to obtain the results shown in Table 9.

TABLE 8

|  | Example | | Comparative Example |
|---|---|---|---|
|  | 12 | 13 | 7 |
| Cyclohexane (kg) | 2.5 | 2.5 | 2.5 |
| 1,3-Butadiene (g) | 392 | 395 | 400 |
| Styrene (g) | 100 | 100 | 100 |
| Dimethoxyethane (g) | 5 | 5 | 5 |
| n-Butyllithium (g) | 0.3 | 0.3 | 0.2 |
| Polymerizing temperature* (°C.) | 10°→88° | 10°→80° | 10°→90° |
| Polymerization conversion (%) | 100 | 100 | 100 |
| Amount of additionally added butadiene (g) | 5 | 5 | 0 |
| Coupling agent | GeCl$_4$ | SnCl$_4$ | None |
| Amount of coupling agent (g) | 0.085 | 0.103 | — |

Note:
*Indicates polymerization initiation temperature → maximum polymerization temperature.

TABLE 9

|  | Example | | Comparative Example |
|---|---|---|---|
|  | 12 | 13 | 7 |
| Mooney viscosity (ML$_{1+4}^{100° C.}$) | 55 | 55 | 55 |
| Bound styrene (% by wt.) | 20 | 20 | 20 |
| Microstructure (%) | | | |
| Cis/vinyl/trans | 5/87/8 | 5/87/8 | 5/87/8 |
| Proportion of butadienyl-metal bond-containing polymer (% by wt.) | 51 | 50 | 0 |
| Properties of vulcanizate | | | |
| 300% Modulus (kgf/cm$^2$) | 195 | 190 | 185 |
| Tensile strength (kgf/cm$^2$) | 248 | 249 | 215 |
| Elongation (%) | 385 | 390 | 395 |
| Hardness (JIS-A) | 68 | 69 | 72 |
| Resilience (%) 25° C. | 53 | 56 | 35 |
| 70° C. | 70 | 72 | 64 |
| Wet skid, 25° C. | 80 | 79 | 80 |

It is seen from the results shown in Table 9 that the polymers in Examples 12 and 13 are excellent in wet skid resistance, rolling resistance and tensile strength, while the uncoupled polymer of Comparative Example 7 is inferior in tensile strength and rolling resistance.

Examples 14, 15 and 16 and Comparative Example 8

Into a 5-liter autoclave were charged 2,500 g of cyclohexane, 395 g of 1,3-butadiene, 100 g of styrene and 25 g of tetrahydrofuran (THF) under a nitrogen atmosphere and the temperature of the resulting mixture was adjusted to 20° C., after which n-butyllithium was added thereto. Polymerization was carried out for one hour while elevating the temperature.

Into the autoclave was further charged 5 g of butadiene and the mixture was subjected to polymerization, upon which the styryl anions (red) at the polymer ends were changed to butadienyl anions (yellow). Thereafter, tin tetrachloride was added in the amount shown in Table 10 to the polymerization product, and the resulting mixture was subjected to reaction at 50° C. for 30 minutes.

To the reaction mixture was then added 5 g of 2,6-di-tert.-butyl-p-cresol, and the solvent was removed from the mixture by steam stipping, after which the residue was dried on a hot roll at 110° C. to obtain a polymer.

The results are summarized in Table 10, in which the physical properties of vulcanizate were obtained by press-vulcanizing a compound having the compounding receipe shown in Table 6 and measuring the properties of the vulcanizate thus obtained. It is seen from the results shown in Table 10 that the tensile strength increases with an increase of the butadienyl-metal bond-containing polymer content. In particular, the tensile strength-increasing effect is remarkable in Examples 15 and 16.

TABLE 10

|  | Comparative Example 8 | Example 14 | Example 15 | Example 16 |
|---|---|---|---|---|
| Amount of $SnCl_4$ added (g) | 0.08 | 0.19 | 0.26 | 0.28 |
| Amount of n-butyllithium added (g) | 0.300 | 0.350 | 0.375 | 0.380 |
| Mooney viscosity ($ML_{1+4}^{100°C.}$) | 40 | 40 | 41 | 43 |
| Microstructure (%) |  |  |  |  |
| Cis/vinyl/trans | 14/60/26 | 15/59/26 | 12/61/27 | 12/62/26 |
| Bound styrene (% by wt.) | 20 | 20 | 20 | 20 |
| Proportion of butadienyl-metal bond-containing polymer (% by wt.) | 15 | 40 | 60 | 70 |
| Properties of vulcanizate |  |  |  |  |
| 300% modulus (kgf/cm$^2$) | 163 | 180 | 188 | 200 |
| Tensile strength (kgf/cm$^2$) | 220 | 242 | 257 | 265 |
| Elongation (%) | 430 | 400 | 400 | 410 |
| Hardness (JIS-A) | 68 | 68 | 67 | 66 |
| Resilience (%) 25° C. | 54 | 59 | 62 | 64 |
| 70° C. | 70 | 72 | 73 | 75 |
| Wet skid, 25° C. | 75 | 75 | 76 | 75 |

Examples 17 to 20 and Comparative Example 9

Into a 5-liter autoclave were charged cyclohexane, 1,3-butadiene, styrene and tetrahydrofuran (THF) in the amount shown in Table 11 under a nitrogen atmosphere, and the temperature of the resulting mixture was adjusted to 20° C. n-Butyllithium was added in the amount shown in Table 11 to the mixture, and the resulting mixture was subjected to polymerization for one hour while raising the temperature.

Further, a small amount (5 g) of 1,3-butadiene was added to the reaciton mixture and, when the change of the color of the reaction system was observed, tin tetrachloride was added and reaction was carried out at 60° C. for 30 minutes.

To the reaction mixture was added 5 g of 2,6-di-tert.-butyl-p-cresol, and the solvent was removed from the mixture by steam stripping, after which the residue was dried on a hot roll at 110° C. to obtain a polymer.

The results were summarized in Table 12, in which the physical properties of vulcanizate were obtained by press-bulcanizing a compound having the compounding recipe of Table 6 at 145° C. for 25 minutes and measuring the properties of the resulting vulcanizate. It is seen from Table 12 that when the styrene content is 50%, the rolling resistance expressed by resilience is low, and the fracture property is bad because the rubber becomes hard and brittle.

TABLE 11

|  | Example 17 | Example 18 | Example 19 | Example 20 | Comparative Example 9 |
|---|---|---|---|---|---|
| Cyclohexane (kg) | 2.5 | 2.5 | 2.5 | 2.5 | 2.5 |
| 1,3-Butadiene (g) | 500 | 470 | 370 | 295 | 245 |
| Styrene (g) | 0 | 25 | 125 | 200 | 250 |
| Tetrahydrofuran (g) | 25 | 25 | 25 | 30 | 30 |
| n-Butyllithium (g) | 0.3 | 0.3 | 0.325 | 0.335 | 0.340 |
| $SnCl_4$ (g) | 0.080 | 0.080 | 0.092 | 0.096 | 0.098 |

TABLE 12

|  | Example 17 | Example 18 | Example 19 | Example 20 | Comparative Example 9 |
|---|---|---|---|---|---|
| Mooney viscosity ($ML_{1+4}^{100°C.}$) | 58 | 60 | 61 | 60 | 59 |
| Microstructure (%) |  |  |  |  |  |
| Cis/vinyl/trans | 12/62/26 | 12/62/26 | 15/59/26 | 16/58/26 | 15/59/26 |
| Amount of bound styrene (% by wt.) | 0 | 5 | 25 | 40 | 50 |
| Proportion of butadienyl-tin bond-containing polymer (% by wt.) | 40 | 40 | 40 | 40 | 40 |
| Properties of the vulcanizate |  |  |  |  |  |
| Tensile strength (kgf/cm$^2$) | 180 | 205 | 250 | 275 | 175 |
| Elongation (%) | 430 | 425 | 410 | 380 | 285 |
| Hardness (JIS-A) | 69 | 69 | 68 | 77 | 85 |
| Resilience (%) 25° C. | 63 | 63 | 60 | 54 | 46 |
| 70° C. | 77 | 77 | 74 | 68 | 64 |
| Wet skid, 25° C. | 63 | 64 | 73 | 72 | 74 |

What is claimed is:

1. A high vinyl polybutadiene or styrene-butadiene copolymer obtained by polymerizing 1,3-butadiene alone or with styrene in a hydrocarbon solvent using an organolithium compound as an initiator, and coupling the resulting polymer with a coupling agent, characterized in that
    (1) the polybutadiene or styrene-butadiene copolymer contains at least 20% by weight of a polymer having in its molecular chain a linkage between butadienyl and at least one metal selected from the group consisting of silicon, germanium, tin and lead,
    (2) the styrene-butadiene copolymer has a styrene content of 40% by weight of less, and
    (3) the polybutadiene or the butadiene portion of said copolymer has a vinyl content of 50 to 95% by weight.

2. A high vinyl styrene-butadiene copolymer obtained by copolymerizing 1,3-butadiene with styrene in a hydrocarbon solvent using an organolithium compound as an initiator and coupling the resulting polymer with a coupling agent, characterized in that (1) the copolymer contains at least 20% by weight of a styrene-butadiene copolymer having in its molecular chain a linkage between butadienyl and at least one metal selected from the group consisting of silicon, germanium, tin and lead, (2) the copolymer has a styrene content of 5 to 40% by weight, and (3) the butadiene portion of said copolymer has a vinyl content of 50 to 95%.

3. A high vinyl polybutadiene or styrene-butadiene copolymer according to claim 1 or 2, wherein said metal-butadienyl linkage is tin-butadienyl linkage.

4. A high vinyl polybutadiene or styrene-butadiene copolymer according to claim 1 or 2, wherein said polymer or copolymer has a Mooney viscosity ($ML_{1+4}^{100°C.}$) of 20 to 150.

5. A high vinyl polybutadiene or styrene-butadiene copolymer according to claim 1 or 2, wherein said polymer or copolymer is obtained by polymerizing 1,3-butadiene alone or with styrene in a hydrocarbon solvent in the presence of an ether or a tertiary amine using an organo-lithium compound as an initiator, converting the polymer chain end to butadienyl-lithium by the addition of a small amount of 1,3-butadiene to the polymerization mixture, and coupling the resulting polymer by the addition of a halide of metal selected from the group consisting of silicon, germanium, tin and lead.

6. A high vinyl polybutadiene or styrene-butadiene copolymer according to claim 5, wherein the polymerization is initiated at a temperature ranging from $-20°$ C. to $+50°$ C. and the polymerization is carried out under such temperature-raising conditions that the temperature difference between the polymerization initiation temperature and the maximum polymerization temperature is 40° C. to 100° C.

7. A high vinyl polybutadiene or styrene-butadiene copolymer according to claim 5, wherein the amount of a coupling agent is 0.2 to 3.0 equivalents in terms of halogen atom of the metal halide per equivalent of butadienyl-lithium.

8. A high vinyl polybutadiene or styrene-butadiene copolymer according to claim 5, wherein the metal halide is represented by one of the following formulas: $R_nMX_{4-n}$, $M'X_2$, $X_3M-R'-MX_3$ and $X_2RM-R'-MRX_2$ wherein M is Si, Ge, Sn or Pb; M' is Sn or Pb; R is alkyl, allyl, or aryl; R' is alkylene or arylene; n is an integer of from 0 to 2.

9. A high vinyl polybutadiene or styrene-butadiene copolymer according to claim 5, wherein the metal halide is selected from the group consisting of silicon tetrachloride, silicon tetrabromide, silicon tetraiodide, germanium tetrachloride, germanium tetrabromide, tin tetrachloride, tin dichloride, lead chloride, tin tetrabromide, methyl trichlorisilane, dimethyl dichlorosilane, butyl trichlorotin, dibutyl dichlorotin, bis(trichlorosilyl)ethane and bis(trichlorostannyl)ethane.

* * * * *